US006487540B1

(12) United States Patent
Smith et al.

(10) Patent No.: US 6,487,540 B1
(45) Date of Patent: Nov. 26, 2002

(54) METHODS AND SYSTEMS FOR ELECTRONIC RECEIPT TRANSMISSION AND MANAGEMENT

(75) Inventors: Steven B. Smith, Holladay, UT (US); Nicolas A. Thomas, Orem, UT (US); Warren M. Rosner, South Jordan, UT (US)

(73) Assignee: In2M Corporation, South Jordan, UT (US)

(*) Notice: Subject to any disclaimer, the term of this patent is extended or adjusted under 35 U.S.C. 154(b) by 41 days.

(21) Appl. No.: 09/625,141

(22) Filed: Jul. 25, 2000

(51) Int. Cl.[7] .............................. G60F 1/12; G60F 17/60
(52) U.S. Cl. ......................................... 705/21; 705/24
(58) Field of Search ..................................... 705/21, 24

(56) References Cited

U.S. PATENT DOCUMENTS

| | | | | |
|---|---|---|---|---|
| 5,821,513 A | * | 10/1998 | O'Hagan et al. | ............ 235/383 |
| 6,029,150 A | | 2/2000 | Kravitz | ........................ 705/39 |
| 6,039,250 A | | 3/2000 | Ito et al. | ..................... 235/380 |
| 6,049,786 A | | 4/2000 | Smorodinsky | ............... 705/40 |
| 6,058,373 A | | 5/2000 | Blinn et al. | .................... 705/26 |
| 6,067,529 A | * | 5/2000 | Ray et al. | ..................... 705/26 |
| 6,250,557 B1 | * | 6/2001 | Forslund et al. | ............ 235/492 |

FOREIGN PATENT DOCUMENTS

| | | | |
|---|---|---|---|
| EP | 0 474 360 | * | 3/1992 |
| WO | WO 99/16029 | * | 4/1999 |

OTHER PUBLICATIONS

"Retail systems: no longer business as usual" by Steven J. Johnson, Journal of Systems Management, v43, n8, p8(5), Aug., 1992, ISSN: 0022–4839.*

"Networks in the mall" by Lisa Terry, LAN Magazine, v9, n7, p133(4), Jul. 1994, ISSN: 0898–0012.*

* cited by examiner

*Primary Examiner*—Kenneth R. Rice
(74) *Attorney, Agent, or Firm*—Kirton & McConkie; Michael F. Krieger

(57) ABSTRACT

Embodiments of the present invention relate to systems, methods and apparatus for the generation, transmission, storage and manipulation of electronic receipts which communicate itemized purchase transaction information. Preferred embodiments comprise wireless vendor devices and wireless purchaser devices which transmit electronic receipts at a point-of-sale for documentation of a purchase transaction. Further processing of the electronic receipt information may be performed with a purchaser device or with a secondary computing device after subsequent receipt transmission to that secondary device.

16 Claims, 3 Drawing Sheets

METHODS AND SYSTEMS FOR ELECTRONIC RECEIPT TRANSMISSION AND MANAGEMENT

THE FIELD OF THE INVENTION

Embodiments of the present invention relate to methods, systems and apparatus for communication and management of electronic receipt information. More particularly, these embodiments provide for the transmission of an electronic receipt from a vendor device to a purchaser device and for subsequent transmission, in some embodiments, of the electronic receipt to management and accounting software. An electronic receipt may be transmitted in conjunction with cash payment, charge, debit and authorization information or may be transmitted as a unique entity. Some embodiments of the present invention may utilize wireless purchasing devices (WPDs) to communicate with point-of-sale wireless vendor devices (WVDs) and arrange the electronic transfer of receipt information.

BACKGROUND

Electronic transactions involving the transfer of money and pecuniary assets are common in our society today. Stocks and bonds may be purchased and traded using only electronic transactions. Goods and services are also commonly purchased over the telephone or via the Internet using credit or debit accounts with electronic authorization.

Retail vendors typically accept credit and debit cards which are verified and authorized using electronic communications methods. Nearly every significant retail vendor accepts some form of credit or debit card as remuneration for goods or services. The accounts accessed through these cards are typically identified by a number embossed on the card and a magnetic strip on the card's surface that is encoded with account information. Transactions involving a credit or debit card account require authorization from the organization who issues the card. This authorization is generally obtained at the point-of-sale by a vendor through electronic communications channels. A transaction amount is determined and the amount of the transaction along with the account identification information are transmitted to the organization which issued the card or an authorization provider(AP). If the account has sufficient credit or finds to cover the transaction amount and the account has not been deactivated for some other reason, the card issuer will send an authorization code to the vendor or AP which indicates that the issuer will transfer the authorized amount to the vendor at an appropriate time.

Account information may be obtained by swiping the electronic strip of the card across a magnetic reader thereby eliminating the need for manual input. The transaction amount may also be transferred from an electronic cash register and combined with the account information automatically to make an authorization request.

These point-of-sale authorization request devices are typically connected to the card issuers or their representatives, sometimes known as authorization processors (APs), through a conventional telephone line. Often a dedicated phone line is connected to the point-of-sale authorization device for quick access to authorization data.

Wireless communication technology has progressed rapidly in recent years. Cell phones and other long-range communication devices have proliferated and are now commonplace among consumers. As technology advances, the cost of these devices is plummeting and even more widespread use is eminent. Mobile phones, pagers, two-way radios, smartphones, personal digital assistants (PDAs) and other communicators are all available on the market.

Internet use is also skyrocketing with millions of new users logging on each year. Internet commerce now represents a significant portion of retail commerce and is used by millions of consumers each day.

Communications protocols exist which allow present generation electronic communications devices to interface with the Internet and access Internet resources. The Wireless Application Protocol (WAP) is an open, global specification that enables mobile wireless communications devices to access and interact with Internet information and services. WAP is a communications protocol and environment which can be built on nearly any operating system including PalmOS, EPOC, Windows CE, FLEXOS, OS/9, JavaOS and others and provides service interoperability between different device families. WAP works with most existing wireless communications networks such as CDPD, CDMA, GSM, PDC, PHS, TDMA, FLEX, ReFLEX, iDEN, TETRA, DECT, DataTAC, Mobitex and others. WAP developers operate Internet gateways specifically tailored for wireless communications device users. These devices typically have small displays, limited memory and less bandwidth that stationary, wire connected computers, therefore, WAP provides for use of eXtended Markup Languages (XMLs) such as the Wireless Markup Language (WML) which offers Internet content tailored for cell phones, PDAs and other wireless, portable communications devices.

Using WAP and similar technologies, vendors, news agencies, financial institutions and other providers allow cell phone and other portable communications device users to buy and sell securities, execute credit card transactions, make account transfers, make bill payments, receive and send e-mail, view news reports. These providers offer seamless integration between the Internet and wireless portable communication devices.

Wireless communication devices are also becoming commonplace in the electronics industry. Wireless networking of portable computers and associated devices is now replacing a large segment of the networking market. Wireless communication devices including wireless networking adapters, hubs and other equipment utilize radio transmitters and receivers to transmit data signals from one device or node to another. These radio transmitters and receivers must utilize a specific frequency band and protocol to accomplish this task. Since these wireless networks and communications areas may often overlap, standards, protocols and privacy protection are necessary. One current standard in the industry has been established by the Institute of Electrical and Electronics Engineers, Inc. (IEEE) and is known as IEEE 802.11. This standard comprises communications standards, protocol and equipment specifications for wireless communication equipment including privacy and encryption provisions.

Another innovation in the wireless communications arena is the advent of short-range wireless networking between portable communications devices. One standard for this technology is known as Bluetooth®, and is being established by a collaborative group of communications and computing companies. Devices incorporating Bluetooth® technology will utilize a micro-chip transceiver for communications between devices. Bluetooth® devices will transmit in the previously unused 2.4 GHz range and will have a range of about 10 meters which may be extended to about 100 meters by increasing transmitter power. Bluetooth® technology promises to be a viable and economical networking solution for interconnection of cell phones, computers, printers, modems, computer peripherals, fax machines and other communications and computing devices. The size of the Bluetooth® transceiver makes it usable in devices as small as palm computers and cell phones.

Another established wireless connectivity standard is known as IrDA and employs infrared radiation to communicate between devices. IrDA is a point-to-point narrow angle, ad-hoc data transmission standard designed to operate over a distance of 0 to 1 meter at speeds of 9600 bps to 16 Mbps. It is typically used in a point-and-shoot fashion by pointing one device at another for direct data transmission.

SUMMARY AND OBJECTS OF THE INVENTION

Preferred embodiments of the present invention provide systems, methods and apparatus which provide for the generation, transmission and management of electronic receipts. Electronic receipts of embodiments of the present invention may comprise purchase transaction information including, but not limited to, total purchase price, vendor ID, purchaser ID, item descriptions, itemized pricing, purchase date, purchase time, discount information, creditor information, authorization information, receipt management information and other transaction information. The electronic receipts of embodiments of the present invention comprise itemized information so that detailed tracking and accounting of purchased items may be performed automatically.

Typically, an electronic receipt will be generated by a vendor device at a point-of-sale. When a transaction takes place, an electronic receipt may be transmitted from the vendor device to a purchaser device where the receipt may be stored for further processing within the device or for further transmission to other devices and systems. Preferred embodiments of the present invention employ a wireless vendor device (WVD) which may be a single device or a combination of devices capable of generating receipt information and transmitting receipt information to other devices. A WVD typically employs wireless communications technology to transmit the receipt information. Embodiments of the present invention may employ a radio frequency transmitter, an Infrared transmitter or other wireless communications methods.

The electronic receipt will generally be transmitted to a purchaser device and, in preferred embodiments, to a wireless purchasing device (WPD) which can store and manipulate the electronic receipt. A purchaser device, such as a WPD, may process and display the electronic receipt information directly as well as retransmit the receipt information to other devices or systems for further processing. A WPD may take the form of a personal digital assistant (PDA), a wireless phone or some other wireless communication device.

Alternate scenarios include purchasing an item using a wireless point of sale system. With this transaction, receipt is transferred from the vendor to the wireless point of sale device over a wireless system such as Bluetooth$_{13}$ or IrDA connection. Under this scenario no direct Internet connection is required as the information is transferred directly over a wireless connection over the WPD and the vendor.

Another purchasing scenario involves the purchasing of an item over a direct Internet connection via an Internet Protocol. For example, WAP. In this purchasing scenario, receipt is transferred from the vendor to the WPD via a wired or a wireless Internet connection.

Once the electronic receipt information has been transmitted to the purchaser device, the information derived from the electronic receipt may be processed and manipulated to provide additional functionality. Preferred embodiments of the present invention employ processing methods which compile multiple electronic receipts and provide a user with an accounting of each item purchased along with purchase information. Items listed in electronic receipts may be categorized into categories of items for accounting purposes. Each item on an electronic receipt may be placed in one or more categories and each item may be related to specific budget accounts. The methods of embodiments of the present invention may provide for real-time budgeting and accounting processes which allow a user to be constantly aware of current account and budget situations.

Accordingly it is an object of some embodiments of the present invention to provide systems, method and apparatus for creating electronic receipts.

It is another object of some embodiments of the present invention to provide systems methods and apparatus for transmitting electronic receipts.

It is yet another object of some embodiments of the present invention to provide systems methods and apparatus for providing accounting and budgeting methods using electronic receipts.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in the corresponding drawings, is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

Figure 1:
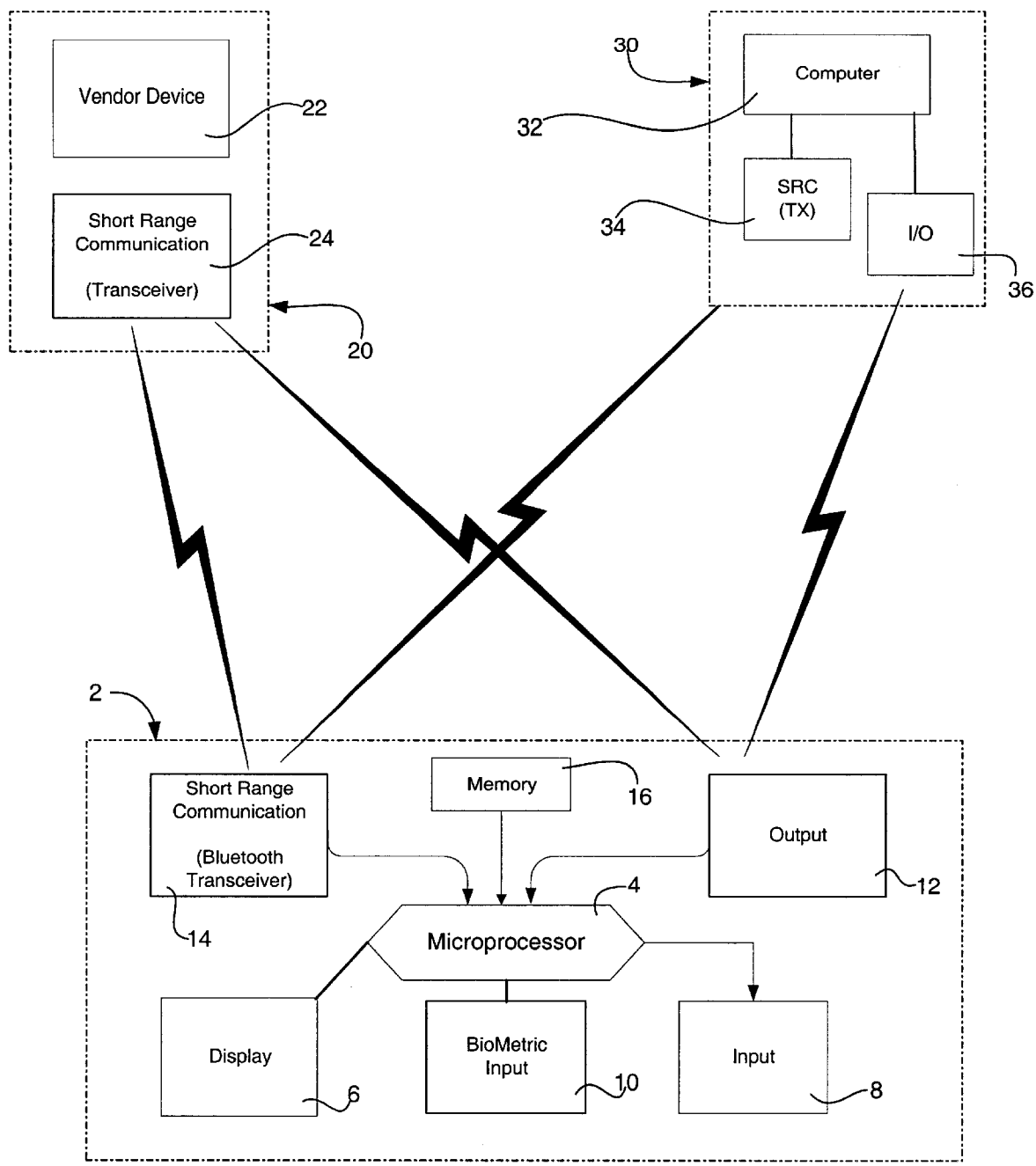
FIG. 1 is a diagram showing components of a preferred embodiment of the present invention.

In reference to FIG. 1, a preferred embodiment of a consumer's wireless purchasing device (WPD) 2 is shown comprising a microprocessor 4 for processing consumer input, communications functions and display functions as well as other functions. WPD 2 may also comprise a display 6 in preferred embodiments, however display 6 is not required for rudimentary embodiments. An input device 8 may also be part of WPD 2 to allow for consumer input and selection. WPD 2 may communicate with other electronic devices using a short-range communications device 14. Short range communications device 14 may be used to communicate with a vendor's point-of-sale device, such as wireless vending device (WVD) 20, with other WPDs, with external communication devices or with other electronic devices. However, the key function of short range communications device 14 is to communicate with WvDs and to receive electronic receipt information therefrom. Short range communications device 14 may be a Bluetooth® transceiver or similar short range networking device or may be an Infrared transceiver such as an IrDA standard port as well as other devices. WPD 2 also comprises memory 16 for storing electronic receipt and other information. WPD 2 may also comprise input/output (I/O) 12 such as a serial port, parallel port, USB port or some other wired communication connection. I/O 12 may also be used to communicate with a vendor device at a point-of-sale transaction when wireless communication is not available or desired.

Some embodiments of WPD 2 may also comprise a biometric input device 10 to verify user identity. Biometric input device 10 may use thumb print analysis, retinal scan analysis or another identification method to identify the WPD user. Once the user is identified, user identity can be matched to account data to ensure that unauthorized users do not gain access to sensitive information or other user's accounts.

Embodiments of the present invention also comprise a wireless vendor device (WVD) 20 which is typically positioned at a point-of-sale for communication with WPDs. WVD 20 will generally comprise a short range communications device 24 configured to communicate with short range communications device 14 used in WPDs. As with communications device 14, device 24 may be a Bluetooth® transceiver, an IrDA port or another communications device. In situations where multiple vendors are accessible to a single WPD at the same time, a Bluetooth® transceiver or similar networking device is preferred to allow multiple party communications. Short range communications device 24 is connected to a vendor device 22 which is typically an electronic computing device such as an electronic cash register, an electronic vending machine, a bar-code reader or other device which may transmit and receive product and transaction information and transmit electronic receipt information. WVD 20 may communicate electronic receipt information or other information via short range transceiver 24 or via direct cable connection to WPD input/output 12 for direct wireline communications.

WPD 2 may also communicate with secondary computing device 30 which may comprise a variety of devices including, but not limited to, a desktop computer, a mainframe computer, a storage device, a network server, an Internet site and many other computing devices. Secondary computing device 30 may be used for storage and processing of electronic receipt information. When WPD 2 has limited processing ability, limited display capability, limited memory or other limited features, secondary computing device 30 may receive information from WPD 2 for processing, display, storage, conversion or other manipulation or use. Even when WPD 2 does not have limited features, information may be transmitted to secondary computing device 30 for archival storage, redundant file maintenance or any other reason.

WPD 2 may communicate with secondary computing device 30 via a short range communication devices 34 & 14 or by direct wireline link through input/output devices 12 & 36. Input/output devices 12 & 36 may comprise modems, network adapters, serial ports, parallel ports, USB ports and any other communications adapters or connections.

Figure 2:
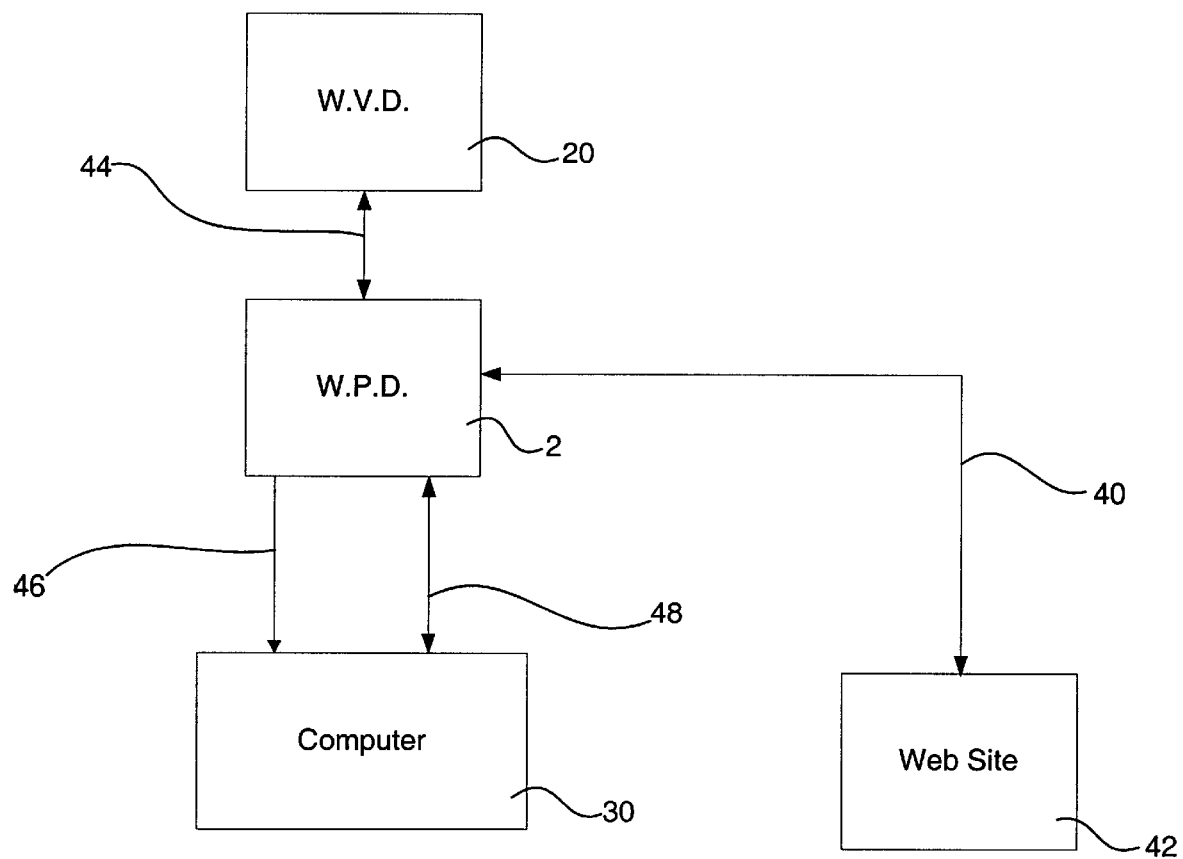
FIG. 2 is a diagram illustrating the typical use of an embodiment of the present invention with a single WVD and WPD.

During use of the systems and methods of embodiments of the present invention an exchange of information 44 takes place between a vendor device such as a WVD 20 and a purchaser device such as a WPD 2 as shown in FIG. 2. This information exchange 44 may comprise multiple transactions and multiple bi-lateral or unilateral data transmissions. In some embodiments, information exchange 44 may comprise credit or debit account identification and authorization as well as identification of vendor and purchaser along with account information. Some or all of information exchange 44 may be encrypted, coded or otherwise manipulated to preserve privacy.

Information exchange 44 also comprises the transmission of electronic receipt information from vendor device 20 to purchaser device 2. Electronic receipt information typically comprises purchase transaction information including, but not limited to, total purchase price, vendor ID, purchaser ID, item descriptions, itemized pricing, purchase date, purchase time, discount information, creditor information, authorization information, receipt management information and other transaction information. The electronic receipts of embodiments of the present invention comprise itemized information so that detailed tracking and accounting of purchased items may be performed automatically. Detailed tracking as well as itemized information, automated logging or indexing of stored receipts is also made available.

Information stored in purchaser device 2 may be compiled, displayed, converted or otherwise manipulated within purchaser device 2 through the use of microprocessor 4, memory 16 and other components. Generally, a user may combine receipt information to obtain a running total of itemized and categorized purchase and budget information. When purchaser device 2 has limited processing capabilities or for other reasons, a user may transfer 46 receipt information from purchaser device 2 to secondary computing device 30 for further processing, storage, archiving and other functions.

In a preferred embodiment, secondary computing device 30 is a web server 42 which can be accessed through a wireless Internet connection. Web server 42 may provide compiled receipt information including itemized and categorized purchase and budget information. Web server 42 may further provide banking, automated bill payment, tax preparation and other financial services in connection with receipt information management.

Secondary computing device 30 such as a home computer or web server may also transmit compiled information 48 back to purchaser device 2 for display and reference while a user is unable to connect to secondary computing device 30.

The electronic receipt information of preferred embodiments of the present invention comprises detailed information in an itemized format so that purchase data can be tracked, stored, and compiled for specific purchase items. Items may also be assigned to certain categories for which aggregate information may be compiled. Items may also be assigned to budget accounts from which funds are drawn when those items are purchased. A user may be alerted to budget account overdrafts when receipt information is received or, in some embodiments, a preliminary receipt may be transmitted from vendor device 20 to purchaser device 2 for budget authorization prior to a final purchase transaction. Upon budget approval a specific purchase may be authorized and a final purchase receipt will be transmitted.

Preferred embodiments of an electronic receipt will have complete file integrity so that users may be assured of accurate receipt information regardless of the location or possession of an electronic receipt file. File integrity may be preserved through independent transmission and storage of original receipt information by an independent verification service or by other data integrity preservation methods.

Figure 3:
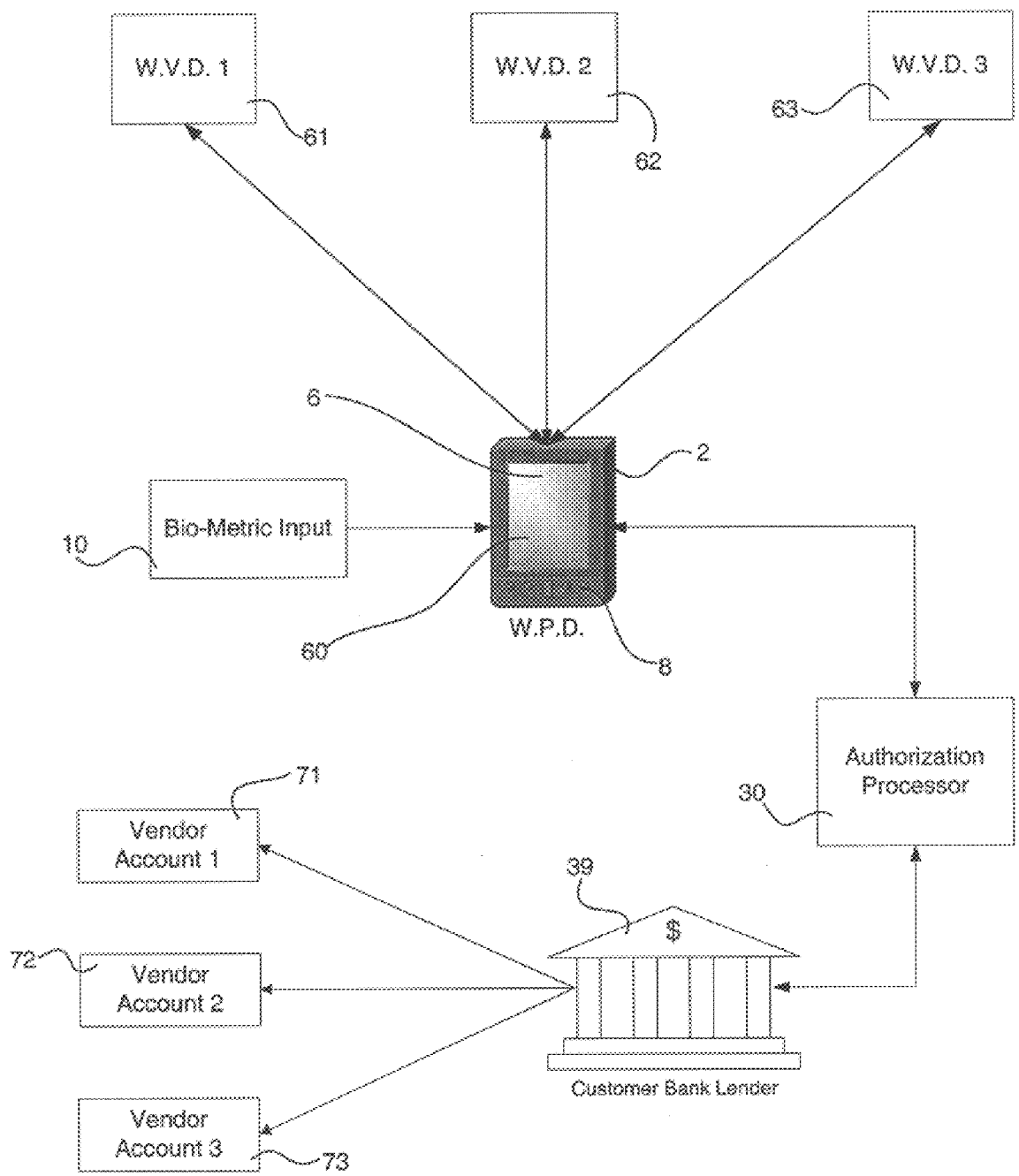
FIG. 3 is a diagram illustrating an embodiment of the present invention that includes multiple WVDs and multiple vendor accounts.

Turning now to FIG. 3, a customer bank lender 39 is shown handling various vendor accounts 71, 72, and 73, debiting and crediting those accounts as authorization is received. An authorization processor 30 takes requests from devices such as wireless purchasing device 2 and either forwards an authorization and response to the request or forwards a denial. If the request cannot be satisfied either because of insufficient finds or some other inconsistency in the process, then a denial is forwarded to the wireless purchasing device. The request forwarded by the wireless purchasing device 2 are received from wireless vending devices 61, 62, and 63. The system may operate using several scenarios. For example, in one scenario, the owner of a wireless purchasing device 2 would place an order from wireless vending device 61. Before the order is transmitted to wireless vending device 61, the proper ownership of the device could be verified through biometric input 10. Once verified, the order could be transmitted wirelessly to the wireless vending device whereupon the device would respond by indicating that there were sufficient quantities of product available at the price requested and would transmit that information back to the wireless purchasing device along with an authorization code. The wireless purchasing device would then forward the authorization code in a request to the authorization processor 30. Authorization processor 30 would then locate the appropriate customer bank lender 39 and forward the request for transfer of funds. The customer bank lender would use the authorization code to locate the correct vendor account and it would transmit funds from the owner of the wireless purchasing device over into the account of the vender. Once the funds have been transferred, a transfer verification would be forwarded back to the authorization processor back to wireless purchasing device 2 and forwarded to wireless vending device 61. Upon receiving the verification, the vending device would release the product to the owner of the wireless purchasing device. It should be understood that the wireless vending device 61 is used only as an example and that purchases can also be made from any number and type of vendors.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

We claim:

1. A system for use in a wireless purchasing environment wherein an electronic receipt is generated by a purchaser-owned device at a point of sale, the system comprising:

a wireless vendor device configured to provide product information to the purchaser-owned device;

a remote authorization processor configured to wirelessly receive an authorization request from the purchaser-owned device, to transmit authorization information to the purchaser-owned device, and to transmit the authorization information to a bank lender to effect a transfer of funds; and the wireless purchaser-owned device configured to send and receive short range communications with the wireless vendor device, to send a long range authorization request to the authorization processor, and to receive the authorization information from the authorization processor, wherein the purchaser-owned device is further configured to store the authorization information received from the authorization processor and to transmit the authorization information to the vendor device to effect the purchase of a product or service.

2. A system as recited in claim 1, wherein the wireless purchaser-owned device comprises a biometric input device to identify a user.

3. A system as recited in claim 1, wherein the purchaser-owned device is configured to selectively manage the authorization information with other authorization information corresponding to other purchases made.

4. A system as recited in claim 1, wherein the purchaser-owned device is a pda.

5. In a wireless purchasing environment wherein an electronic receipt is generated by a purchaser-owned device at a point of sale, a method for effecting a purchase of a product or service, the method comprising the steps for:

obtaining sales information from a wireless vendor;

sending a long range authorization request from a wireless purchaser-owned device to an authorization processor;

receiving authorization information at the wireless purchaser-owned device from the authorization processor; and transmitting the authorization information from the wireless purchaser-owned device to the wireless vendor device to effect the purchase.

6. A method as recited in claim 5, further comprising the steps for:

receiving biometric information at the purchaser-owned device; and using the biometric information at the purchaser-owned device to identify a user.

7. A method as recited in claim 5, further comprising the step for storing a copy of the authorization information at the purchaser-owned device.

8. A method as recited in claim 7, further comprising the step for managing the copy of the authorization information and other authorization information on the purchaser-owned device that corresponds to other purchases.

9. A method as recited in claim 5, wherein the wireless purchaser-owned device is a pda.

10. In a wireless purchasing environment wherein an electronic receipt is generated by a purchaser-owned device at a point of sale, a method for providing authorization to effect a purchase, the method comprising the steps for:

receiving, at an authorization processor, a long-range authorization request from a wireless purchaser-owned device;

transmitting authorization information from the authorization processor to the wireless purchaser-owned device to enable the wireless purchaser-owned device to provide the authorization information to a wireless vendor device to effect the purchase; and transmitting a copy of the authorization information to a corresponding bank lender to effect a transfer of funds corresponding to the purchase.

11. A method as recited in claim 10, wherein the authorization request includes information identifying a user of the purchaser-owned device.

12. A method as recited in claim 11, wherein the identification information includes biometric information of the user.

13. A method as recited in claim 11, wherein the authorization request further includes vendor information provided by the vendor device to the purchaser-owned device.

14. A method as recited in claim 10, further comprising the step for transferring the funds from a first account to a second account.

15. A method as recited in claim 14, wherein the first account is owned by the purchaser and the second account is owned by the vendor.

16. A method as recited in claim 10, wherein the wireless purchaser-owned device is a pda.

* * * * *